US006137996A

United States Patent [19]

Baumann

[11] Patent Number: 6,137,996

[45] Date of Patent: Oct. 24, 2000

[54] APPARATUS AND METHOD FOR OVERCOMING THE EFFECTS OF SIGNAL LOSS DUE TO A MULTIPATH ENVIRONMENT IN A MOBILE WIRELESS TELEPHONY SYSTEM

[75] Inventor: William John Baumann, Tempe, Ariz.

[73] Assignee: Motorola, Inc., Schaumburg, Ill.

[21] Appl. No.: 09/119,492

[22] Filed: Jul. 20, 1998

[51] Int. Cl.[7] .......... H04Q 7/20

[52] U.S. Cl. .......... 455/82; 455/284

[58] Field of Search .......... 455/82, 284, 276.1, 455/277.1; 343/895

[56] References Cited

U.S. PATENT DOCUMENTS

| | | | |
|---|---|---|---|
| 4,554,554 | 11/1985 | Olesen et al. | 343/895 |
| 4,864,641 | 9/1989 | Nakamura | 455/276.1 |
| 5,568,158 | 10/1996 | Gould | 455/284 |
| 5,896,113 | 4/1999 | O'Neill, Jr. | 455/277.1 |
| 5,909,196 | 6/1999 | O'Neill, Jr. | 343/895 |
| 6,025,816 | 2/2000 | Dent et al. | 343/895 |

FOREIGN PATENT DOCUMENTS

WO 97/00542 1/1997 WIPO .

*Primary Examiner*—Daniel S. Hunter
*Assistant Examiner*—Myron K. Wyche
*Attorney, Agent, or Firm*—Lalita P. Williams

[57] ABSTRACT

A communications device transmitting and receiving RF signals having an antenna including an antenna core, a plurality of first polarized antenna elements wound about the antenna core in a first direction, a plurality of second polarized antenna elements wound about the antenna core in a second direction, and a plurality of RF PIN diodes inserted in the plurality of first and second polarized antenna elements at the points where the plurality of first polarized antenna elements and the second polarized antenna elements overlap. A communications device and method for decreasing fading of a call due to multipath by switching between polarizations of the antenna when the power level of the RF signals drops below a predetermined threshold. A communications device and method for decreasing fading of a call by averaging power levels on both polarizations of the antenna.

6 Claims, 8 Drawing Sheets

| POLARIZATION | DC BIAS RH1 | DC BIAS RH2 | DC BIAS RH3 | DC BIAS LH1 | DC BIAS LH2 | DC BIAS LH3 | FREQUENCY |
|---|---|---|---|---|---|---|---|
| RHCP | 1 | 1 | 1 | 0 | 0 | 0 | $f_1$ |
| RHCP | 1 | 1 | 0 | 0 | 0 | 0 | $f_2$ |
| RHCP | 1 | 0 | 0 | 0 | 0 | 0 | $f_3$ |
| RHCP | 0 | 0 | 0 | 0 | 0 | 0 | $f_4$ |
| LHCP | 0 | 0 | 0 | 1 | 1 | 1 | $f_1$ |
| LHCP | 0 | 0 | 0 | 1 | 1 | 0 | $f_2$ |
| LHCP | 0 | 0 | 0 | 1 | 0 | 0 | $f_3$ |
| LHCP | 0 | 0 | 0 | 0 | 0 | 0 | $f_4$ |

FIG.5

| FREQUENCY | CELLULAR SYSTEM | FREQ. RANGE (MHz) | BAND CENTER (MHz) | WAVELENGTH (INCHES) | ANTENNA ELECTRICAL LENGTH (INCHES) |
|---|---|---|---|---|---|
| $f_1$ | AMPS | 824-892 | 860 | 13.1 | 3.3 |
| $f_2$ | GSM | 890-960 | 925 | 11.9 | 3.0 |
| $f_3$ | IRIDIUM SYS. | 1610-1626 | 1618 | 7.1 | 1.8 |
| $f_4$ | PCS | 1910-1930 | 1920 | 6.0 | 1.5 |

FIG.6

POLARIZATION SWITCHING POWER RELATIONSHIPS

POLARIZATION AVERAGE POWER RELATIONSHIPS

APPARATUS AND METHOD FOR OVERCOMING THE EFFECTS OF SIGNAL LOSS DUE TO A MULTIPATH ENVIRONMENT IN A MOBILE WIRELESS TELEPHONY SYSTEM

FIELD OF THE INVENTION

The present invention relates generally to the field of wireless communication, and more particularly to a wireless communication device. Although the invention is subject to a wide range of applications, it is especially suited for use in a dual mode subscriber unit, and is particularly described in that connection.

BACKGROUND OF THE INVENTION

As different wireless analog and digital cellular telephone systems and satellite systems are promulgated throughout the world, antennas corresponding to each of the systems are developed. System subscribers who travel through different systems or who use a telephone in a geographical area with more than one system, desire a single telephone usable on more than one system. Communication on differing bands of frequencies in the same radio is therefore desired. Because antennas of different bands for the same telephone could likely be inconvenient for a user, a single antenna structure capable of operation at more than one band is desired.

In a radio frequency (RF) communication system, a user of a handheld subscriber unit (SU) on a call can experience fading of the call due to multipath. Multipath is a phenomena by which out of path signals, such as out of phase noise signals, add to the main signal to produce a distorted signal in the SU. This multipath signal arrives at the SU and causes a fade to occur when the multipath signal is combined with the main path signal. During this fade, it will appear to one or more parties on the call that the phone call has been dropped.

Fading due to multipath typically results in power losses of 10–40 dB, requiring other components along the path from the SU's transmitter to receiver (link budget) to compensate for severe fades in order to preserve the quality of service. This tends to be especially true for a hand-held mobile unit such as the IRIDIUM® satellite SU and other satellite and terrestrial mobile telephony systems. Fades can last a rather long period of time, such as several tens of seconds for a slow moving, terrestrial based person who is walking along at a normal pace.

Research into fading has demonstrated that in a mobile RF communication system with an antenna having dual, orthogonal polarizations, multipath fading affects one polarization of the antenna for a period of time and then begins to affect the other polarization as the orthogonal polarization recovers.

U.S. Pat. No. 4,554,554 ('554 patent) discloses a quadrifilar helix antenna whereby PIN diodes are placed at predetermined locations on the antenna coaxial cable radiating elements for tuning the antenna in separate discrete frequency bands. However, the quadrifilar antenna of the '554 patent is not a dual orthogonally polarized antenna, and the '554 patent does not address the effects of multipath on a dual orthogonally polarized antenna.

PCT published application No. PCT/US96/10459 discloses a double helix antenna system including a first helix conductor wound in a first direction about a vertical axis of the double helix antenna and a second helix conductor wound in a second direction about the longitudinal axis of the antenna. In this system, the two conductors have to be physically orthogonal to each other at the points of intersection in order to provide minimal coupling and increase electrical isolation of one conductor from the other. The orthogonal winding relationship enables operation of separate helical antennas in close physical proximity. However, the orthogonality of the conductors at the point of intersection necessitates a given pitch for each conductor and may limit the frequency range of the antenna and its utility to a roaming user.

A need therefore exists for a multi-polarized, multiple band antenna arrangement that can decrease the effect of fading of a call due to multipath without compromising the frequency range and utility of the antenna.

BRIEF DESCRIPTION OF THE DRAWINGS

FIG. 5 is a logic table for selecting the antenna's polarization and frequency band of operation.

FIG. 6 is a table showing the electrical length of the antenna elements for various frequency bands of operation.

SUMMARY OF THE PREFERRED EMBODIMENT

Figure 1:
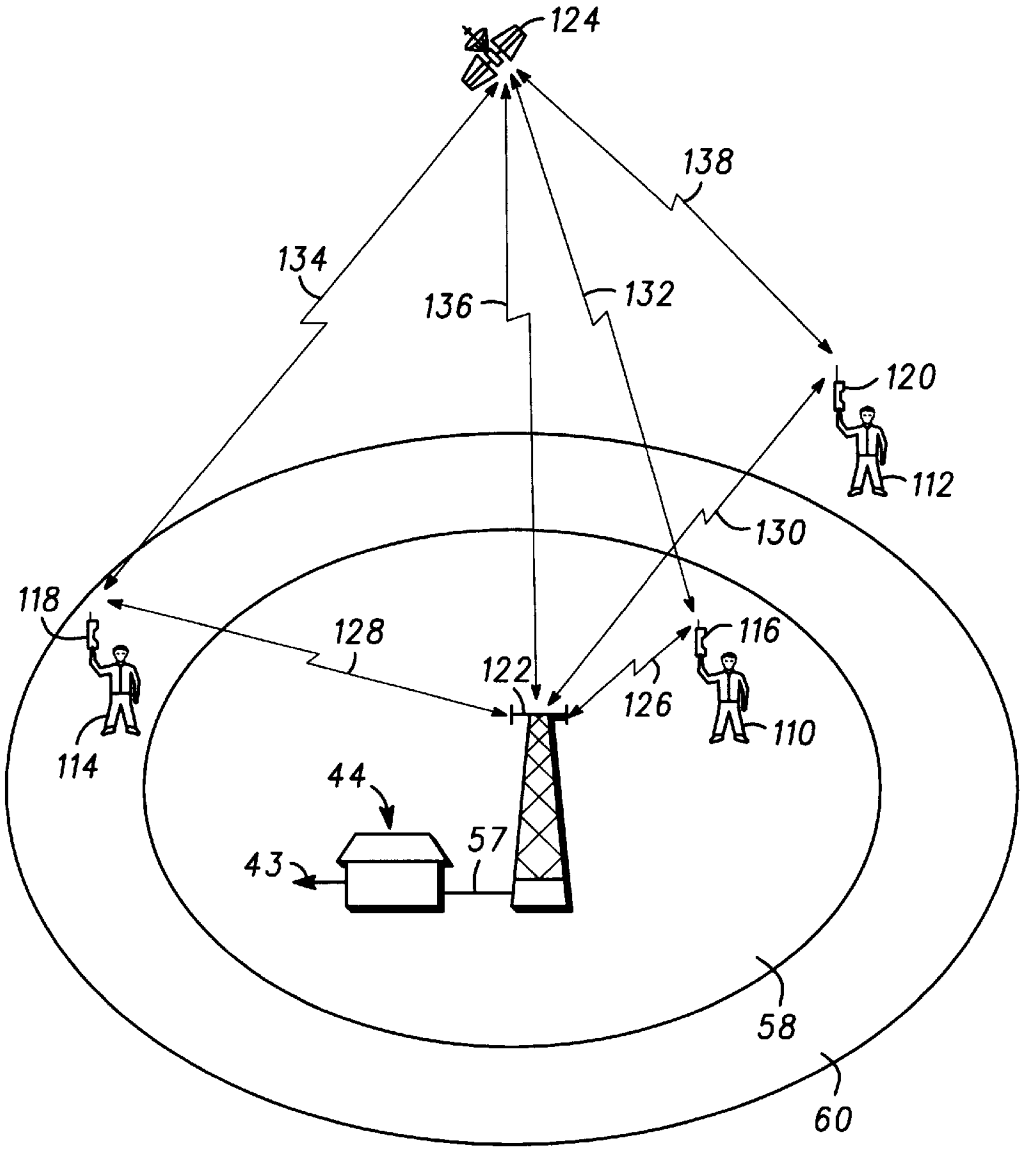
FIG. 1 is a block diagram of a wireless communication system in which the present invention can operate.
Figure 3:
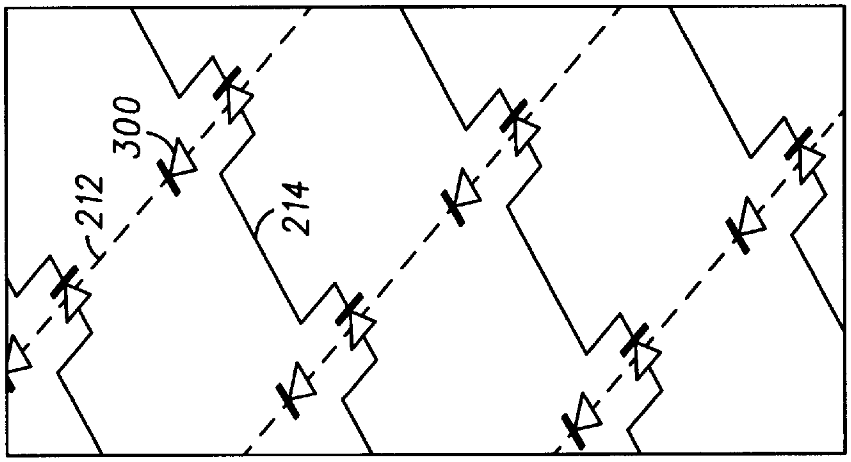
FIG. 3 is a plan view of the antenna of FIG. 2 showing PIN diodes at points of overlap of the antenna elements.

A first aspect of the invention provides a communications device having a transmitter and receiver capable of transmitting and receiving a signal on dual orthogonal polarizations and capable of switching between the polarizations. The device includes a dual orthogonally polarized antenna coupled to the receiver, wherein the antenna has an antenna core; a first switch coupled to the antenna for switching between a first polarization and a second polarization of the antenna; and a controller for controlling the switch to switch between the first polarization of the antenna and the second polarization of the antenna.

A second aspect of the invention provides a communications device having a transmitter and receiver capable of transmitting and receiving a signal on dual orthogonal polarizations and capable of averaging the polarizations. The device includes a dual orthogonally polarized antenna coupled to the receiver, wherein the antenna has an antenna core; a first switch coupled to the antenna for switching between a first polarization and second polarization of the antenna; a first RF coupler coupled to the first switch; a delaying mechanism having a first end and a second end, wherein the delaying mechanism is coupled to the first RF coupler on the first end; a second RF coupler coupled to the second end of the delaying mechanism; and a controller coupled to the first switch.

A third aspect of the invention provides, in a communications device transmitting and receiving an RF signal with an associated power level, the device having a first switch connected to an antenna having a plurality of first orthogonally polarized elements and a plurality of second orthogonally polarized elements, a method of switching between the plurality of first orthogonally polarized elements and the plurality of second orthogonally polarized elements comprising the steps of: initializing the transceiver to operate on one of the plurality of first orthogonally polarized elements or second orthogonally polarized elements; receiving a data packet of the RF signal; measuring the power level of the data packet; storing the power level; setting the power level as a reference power level; determining whether a predetermined number of data packets have been received; and if the predetermined number have been received, computing the average power of the predetermined number of data packets and if the average power is below the reference power level, switching the transceiver to an opposite plurality of cross polarized components.

A fourth aspect of the invention provides, in a communications device transmitting and receiving an RF signal with an associated power level, the transceiver coupled to an antenna having a plurality of first orthogonally polarized elements and a plurality of second orthogonally polarized elements, a method of averaging the plurality of first orthogonally polarized elements and the plurality of second orthogonally polarized elements comprising the steps of: initializing the device to one of the plurality of first orthogonally polarized elements or second orthogonally polarized elements; receiving a first data packet of the RF signal; delaying the first data packet to produce a delayed data packet; setting the device to the other of the plurality of orthogonally polarized elements or second orthogonally polarized elements; receiving a second data packet of the RF signal, wherein the second data packet contains the same data as the first data packet; and averaging the second data packet with the delayed data packet to produce an averaged data packet.

The present invention's antenna arrangement and methods of decreasing fading of a call due to multipath provide several advantages. The dual polarized quadrifilar antenna provides the versatility of having two sets of antenna elements capable of operating independently of one another over a range of frequency bands. The method of polarization switching enables the SU's transceiver to predict when a fade is about to occur and switch to operation on the opposite polarization of the antenna before the fade occurs. This way, the mobile user can carry on a conversation with minimal interruption due to fading. Similarly, for situations when the occurrence of a fade is difficult to predict, the method of polarization averaging allows the mobile user to carry on a conversation with minimal interruption due to fading.

Additional advantages and novel features of the invention will be set forth in part in the description which follows, wherein the preferred embodiment of the invention is shown and described. Reference will now be made in detail to an embodiment configured according to the present invention.

DESCRIPTION OF THE PREFERRED EMBODIMENT

FIG. 1 is a pictorial representation of a wireless communication system that can employ the antenna arrangement and methods of the present invention. As shown, mobile subscribers 110, 112, 114 use subscriber units 116, 118, 120 to communicate with either a terrestrial cellular base station 122 via signals 126, 128, 130 or a satellite 124 via signals 132, 134, 138. Cellular base station 122 communicates with the satellite 124 via signal 136 and communicates with a Mobile Switching Center 44 (MSC) via signal path 57. The MSC 44 communicates with the Public Switched Telephone Network (not shown) via signal path 43.

Mobile subscriber 110, located within area 58 has sufficient power to communicate via subscriber unit 116 with either cellular base station 122 or satellite 124. Signal 126 to/from the cellular base station 122 is stronger than signal 132 to/from the satellite 124 because of the closer proximity of subscriber 110 to cellular base station 122 than to satellite 124. Thus, a dual-mode SU 116 will likely select the frequency range of the terrestrial cellular base station 122 for establishing a telephony communications channel. An advantage of the present invention is that it enables the communication to take place via either signal 132 or signal 126 by providing an antenna that can be changed in electrical length for the frequency band of interest.

Mobile subscriber 114, located within area 60, is at a range such that signal 128 from cellular base station 122 is received at relatively the same power level as signal 134 from satellite 124. In this case, the dual-mode subscriber unit 118 can choose equally between establishing a communications channel with the terrestrial cellular base station 122 or with the satellite 124. For example, SU 118 could choose cellular base station 122 because the terrestrial cellular system offers a better rate at a given time for a given location than satellite 124 associated with a mobile satellite service. Mobile subscriber 112, located outside of area 60, is out of range of cellular base station 122 via signal 130. In this case, the SU 120 would establish a communication channel with satellite 124 via signal 138.

In the preferred embodiment, the antenna arrangement and methods of the present invention are implemented in the subscriber unit 116, 118, 120, and are described in detail below with reference to FIGS. 2–8.

Figure 2:
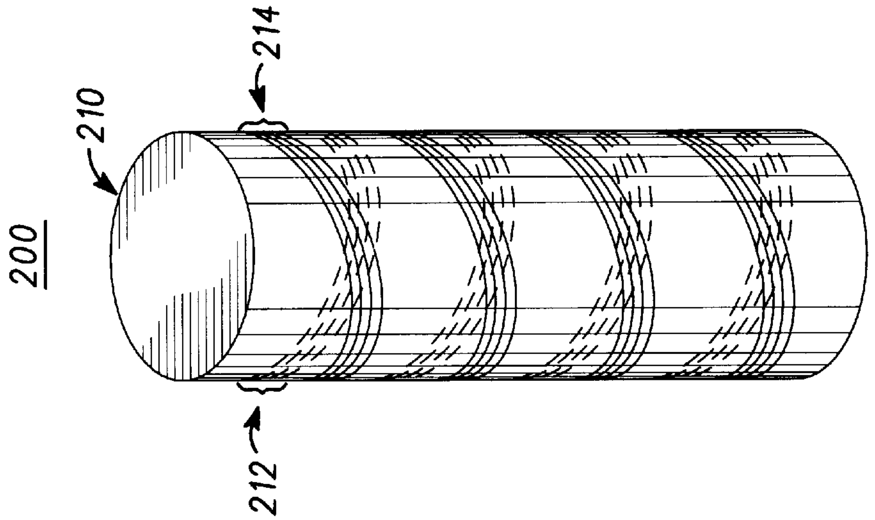
FIG. 2 is a pictorial representation of the preferred embodiment of the dual polarized quadrifilar antenna of the present invention.

FIG. 2 is a pictorial representation of the preferred embodiment of the dual polarized quadrifilar helix antenna 200 that can be used in the present invention. The antenna 200 includes a cylindrical core 210, four left hand circularly polarized (LHCP) elements 212 and four right hand circularly polarized (RHCP) components 214. The LHCP and RHCP elements 212, 214 are wound in opposite directions around the cylindrical core 210 and can operate independently as separate antennas. Preferably, the cylindrical core 210 comprises an insulating dielectric and the LHCP and RHCP elements 212, 214 comprise a conductive material such as a coaxial cable or microstrip line on a printed circuit board. As shown in the plan view of the antenna 200 in FIG. 3, a plurality of PIN diodes 300 are disposed in the LHCP and RHCP elements 212, 214 at points in which the elements 212, 214 overlap. Preferably, the minimum number of diodes 300 used is determined by the number of points of overlap between the elements 212, 214. Additional PIN diodes can be used depending on the application. For example, one should consider the number of pieces that an element 212, 214 should be broken into in order to minimize interference of the element 212, 214 on the opposite sense of polarization.

In addition to minimizing interference between the LHCP and RHCP elements 212, 214 of the antenna 200, the PIN diodes can be used to enable the antenna to operate in multiple discrete frequency bands. In particular, the in-line, series PIN diodes 300 disposed in the LHCP and RHCP antenna elements can be used to open circuit portions of the element, thereby reducing the antenna's electrical length to match the frequency band of interest. This technique can be used over a broad RF bandwidth that encompasses frequency ranges of both terrestrial cellular and satellite mobile communication systems. For example, in the preferred embodiment the technique is used to break up the overall length of the antenna into four frequency bands (logic table of FIG. 5). At least three PIN diodes per antenna element are used to break up the element into four distinct electrical lengths, each length corresponding to a different quarter wavelength for a different frequency band of operation. Additional diodes may be needed if isolation between the arms is too low or if there are additional overlap points between the LHCP and RHCP elements 212, 214.

Figure 4:
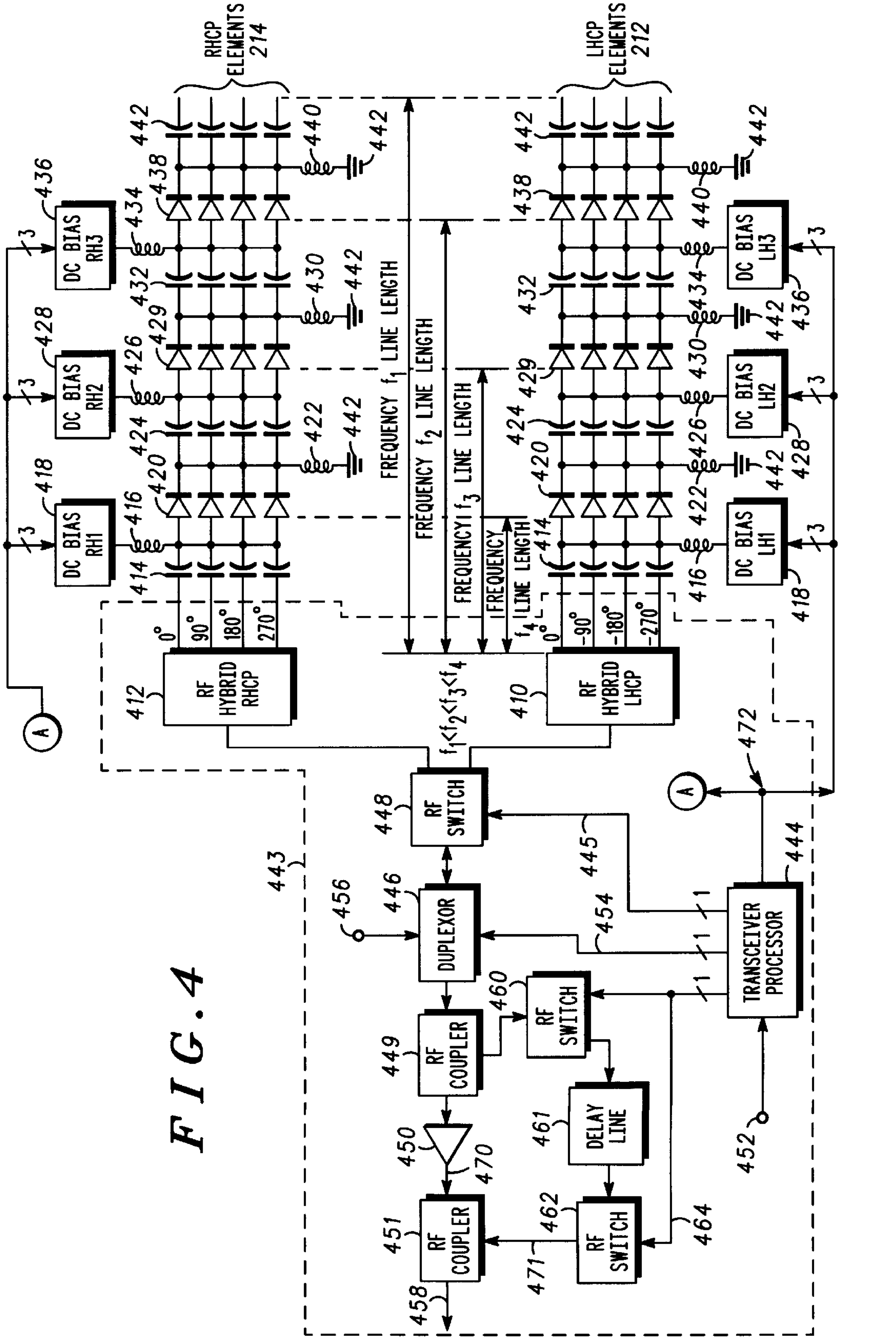
FIG. 4 is a schematic block diagram of the dual polarized quadrifilar antenna and receiver arrangement of the present invention including polarization switching and polarization averaging circuitry.

FIG. 4 shows a schematic block diagram of the quadrifilar antenna that can be used with the subscriber units 116, 118, 120 of FIG. 1. FIG. 4 also shows circuitry 443 located in the RF section of the SU's receiver, preferably on the transceiver board. The circuitry 443 is coupled to the antenna 200 for implementing the polarization switching and polarization averaging methods of the present invention.

The right side portion of FIG. 4 shows an embodiment for enabling the antenna 200 to operate in multiple discrete frequency bands. As shown, four LHCP elements 212 and four RHCP elements 214 are connected to an RF hybrid LHCP block 410 and an RF hybrid RHCP block 412, respectively. The hybrids 410, 412 are preferably 4-to-1 hybrids which divide the signal into four signals with phase progressions of 0°, 90°, 180° and 270°, respectively, on the four antenna elements. Preferably, each LHCP and RHCP element 212, 214 comprises a plurality of DC blocking capacitors 414, 424, 432, 442 in series with PIN diodes 420, 429, 438. Coupled between capacitor 414 and PIN diode 420 is a first inductor 416 connected in series with a first DC bias circuit 418. The DC bias circuits 418 are also connected to a transceiver processor 444. Coupled between PIN diode 420 and capacitor 424 is a second inductor 422, which is also coupled to a ground 442. Coupled between capacitor 424 and PIN diode 429 is a third inductor 426 connected in series with a second DC bias circuit 428, which is also coupled to the transceiver processor 444. Coupled between PIN diode 429 and capacitor 432 is a fourth inductor 430, which is also coupled to ground 442. Coupled between capacitor 432 and PIN diode 438 is a fifth inductor 434 connected in series with a third DC bias circuit 436, which is also coupled to the transceiver processor 444. Coupled between PIN diode 438 and capacitor 442 is a sixth inductor 440, which is also coupled to ground 442. The DC Bias circuits, RF Hybrids, PIN diodes, capacitors and inductors shown in FIG. 4 are off the shelf parts commonly known in the art and available from many sources. The DC Bias circuits are also known to practitioners of the art as switched voltage sources, which apply either a forward bias (logic "1" in FIG. 5) or a reverse bias (logic "0" in FIG. 5) when commanded by transceiver processor 444. To maximize signal energy through the LHCP and RHCP antenna elements, PIN diodes with low "on" resistance should be used.

Since a helix antenna relies on an element length of a quarter wavelength, where the wavelength is proportional to the frequency, one can tune the electrical length of the antenna elements 212, 214 by forward biasing the desired number of PIN diodes 420, 429, 438 for the desired frequency of operation. In other words, by forward biasing only those diodes to make the electrical length approximately equal to a quarter wavelength for a given operating frequency, the antenna will operate efficiently at a frequency band corresponding to the given operating frequency. All other frequencies will be significantly attenuated.

For the preferred embodiment, selection of the frequency range of operation and the polarization (which is described in detail later herein) is performed by the transceiver processor 444 according to the table in FIG. 5. As shown in the table, if RHCP polarization is desired for frequency range f1, the processor 444 commands the RHCP DC bias circuits 418, 428, 436 to bias the RHCP PIN diodes 420, 429, 438 on (logic 1). The processor 444 commands the LHCP DC bias circuits 418, 428, 436 to bias the LHCP diodes 420, 429, 438 off (logic 0). If RHCP polarization is desired for frequency range f2, the processor 444 commands the RHCP DC bias circuits 418, 428 to bias the RHCP PIN diodes 420, 429 on. The processor also commands RHCP DC bias circuit 436 to bias RHCP PIN diode 438 off and commands LHCP DC bias circuits 418, 428, 436 to bias LHCP diodes 420, 429, 438 off. Selection of RHCP polarization for frequency bands f1 and f2 have just been described. In a similar manner, processor 444 selects RHCP polarization for frequency bands f3 and f4 and LHCP polarization for frequency bands f1–f4 according to the table in FIG. 5.

In the process described above, biasing the PIN diodes on creates a short circuit through the diodes. Biasing the PIN diodes off creates an open circuit. The capacitors 414, 424, 432, 442 provide an RF coupled path through the PIN diodes 420, 429, 438 while blocking the DC bias from those diodes that are not biased on. The inductors 416, 422, 426, 430, 434, 440 (RF chokes) prevent the RF signal through the antenna elements 212, 214 from coupling to the DC bias circuits 418, 428, 436.

The table in FIG. 6 shows the electrical length of the antenna elements 212, 214 that result from short circuiting selected PIN diodes 420, 429, 438 according to the desired operating frequency. For an operating frequency of 860 MHz (f1), forward biasing diodes 420, 429, 438 results in an electrical length of approximately 3.3 inches for each of the four LHCP or RHCP antenna elements. For an operating frequency of 925 MHz (f2), biasing diodes 420, 429 on and diode 438 off results in an electrical length of approximately 3.0 inches for each of the four LHCP or RHCP antenna elements. For an operating frequency of 1618 MHz (f3), biasing diode 420 on and diodes 429 and 438 off results in an electrical length of approximately 1.8 inches for each of the four LHCP or RHCP antenna elements. For an operating frequency of 1920 MHz (f4), biasing all of the diodes 420, 429, 438 off results in an electrical length of approximately 1.5 inches for each of the four LHCP or RHCP antenna elements.

As shown in FIG. 6, one antenna can be configured to support satellite communications with the IRIDIUM® system at L band (1610–1626 MHz) and/or terrestrial communications with Advanced Mobile Phone Service (AMPS) cellular (824–892 MHz), Groupe Special Mobile (GSM) (890–960 MHz) and /or Personal Communicator System (PCS) (1910–1930 MHz).

Similarly, this antenna configuration can support other satellite and terrestrial cellular systems operating in these or other similarly related frequency bands.

The polarization switching and polarization averaging methods of the present invention will now be described with reference to FIGS. 4 and 7–11. The left side of FIG. 4 shows circuitry 443 used to implement switching between receiving signals on the LHCP antenna elements 212 and the RHCP antenna elements 214. This same circuitry 443 is also used to implement averaging the signals received on the LHCP and RHCP elements 212, 214.

In the preferred embodiment, the circuitry 443 includes a duplexor 446, a first RF switch 448, a first RF coupler 449, a second RF switch 460, a third RF switch 462, a delay line block 461, an amplifier 450, a second RF coupler 451 and a transceiver processor 444 configured as shown in FIG. 4. All components comprising circuitry 443 are off-the-shelf components commonly known in the art and available from many sources.

The duplexor 446 is coupled on a first side to the first RF switch 448 for transmitting or receiving signals on either the RHCP antenna elements 214 (RHCP polarization) or the LHCP antenna elements 212 (LHCP polarization). The first RF switch 448 is coupled to the RHCP antenna elements 214 through an RF hybrid RHCP circuit 412 and coupled to the LHCP antenna elements 212 through an RF hybrid LHCP circuit 410. On a second side, the duplexor 446 is coupled to the SU's transmitter (not shown) via signal line 456 and the SU's receiver (not shown) via signal line 458 for selecting between the transmitter and the receiver under control of the processor 444 via signal line 454. On the second side, the duplexor 446 is also coupled to the first RF coupler 449 for passing a signal through to the amplifier 450 and for sending the signal through the second RF switch 460 (when the switch 460 is closed) to the delay line block 461. The signal is delayed in the delay line block 461 and is passed through the third RF switch 462 (when the switch 462 is closed) to a second RF coupler 451. Second RF coupler 451 also receives the amplified signal from amplifier 450.

The transceiver processor 444 is coupled to the first RF switch 448 through signal line 445 to command the switch 448 to select either the RHCP antenna elements 214 or the LHCP antenna elements 212. During polarization switching, the processor 444 receives power measurements from a power measurement circuit (not shown) via signal line 452. The processor 444 is coupled to second and third RF switches 460, 462, through signal line 464 to close the switches during polarization averaging (described later herein). The processor 444 is coupled to the RHCP and the LHCP DC bias circuits 418, 428, 436 to control biasing of the PIN diodes 420, 429, 438 via line 472.

The present invention provides two methods of overcoming fading of a call between mobile subscribers 110, 114, 116 (FIG. 1) due to multipath. The first method is called polarization switching. Polarization switching is used when fading is slow and can be predicted, such as in the case of a mobile subscriber walking along the street while engaged in a call. In the polarization switching method, when a call is received, the transceiver processor 444 monitors the power level of the incoming data packets from a power measurement circuit such as an RSSP circuit (not shown) via signal line 452 (FIG. 4). During polarization switching, second RF switch 460 and third RF switch 462 remain in the open position at all times. First RF switch 448 is used to select between one of two orthogonal polarizations.

Figure 7:
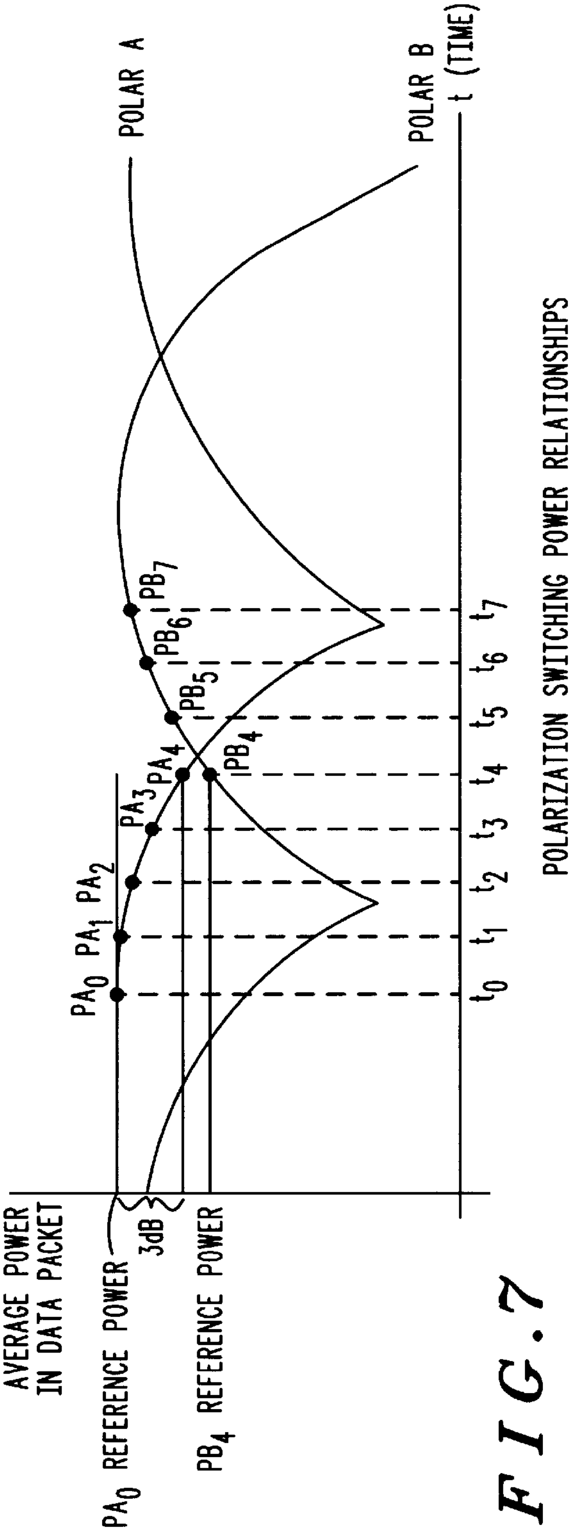
FIG. 7 is a graphical plot of a typical power relationship between sampled data packets for the polarization switching method.

FIG. 7 shows a typical power relationship versus time between sampled data packets for the polarization switching method. The first data packet received on polarization A (e.g. RHCP or vertical linear polarization) at time $t_0$ is set as a reference power level ($PA_0$), against which the power level of all subsequently received data packets are compared. The transceiver processor 444 continuously monitors the power level of subsequent data packets ($PA_1$, $PA_2$, $PA_3$, etc.) to determine whether the average power level of several received packets, preferably three to six samples, drops by a predetermined threshold below the reference, preferably 3 dB. In the preferred embodiment, if the average power has dropped by 3 dB from the reference level ($PA_0$), indicating the beginning of a slow fade due to multipath, the processor 444 commands the first RF switch 448 (FIG. 4) to change from polarization A to polarization B (e.g. LHCP or horizontal linear polarization). Then, the power level measurement cycle begins again with $PB_5$ on polarization B set as the reference power level at time $t_5$. If, on the other hand, more than three to six samples on polarization A have been received without the power level dropping by 3 dB, the second sample in the sequence ($PA_1$) is set as the reference power level and an additional sample is taken. This procedure provides a new reference power level and allows a fixed number of samples to be accumulated by the processor each time.

As described herein, the polarization switching is performed in the SU 116, 118, 120 (FIG. 1). It will be recognized by one of ordinary skill in the art that the polarization switching could also be performed by either the satellite 124 or terrestrial base station 122 which could monitor the signal quality from the SU 116, 118, 120 and detect the beginning of a multipath fade. Thus, the technique can be applied to systems other than that described herein.

Figure 9:
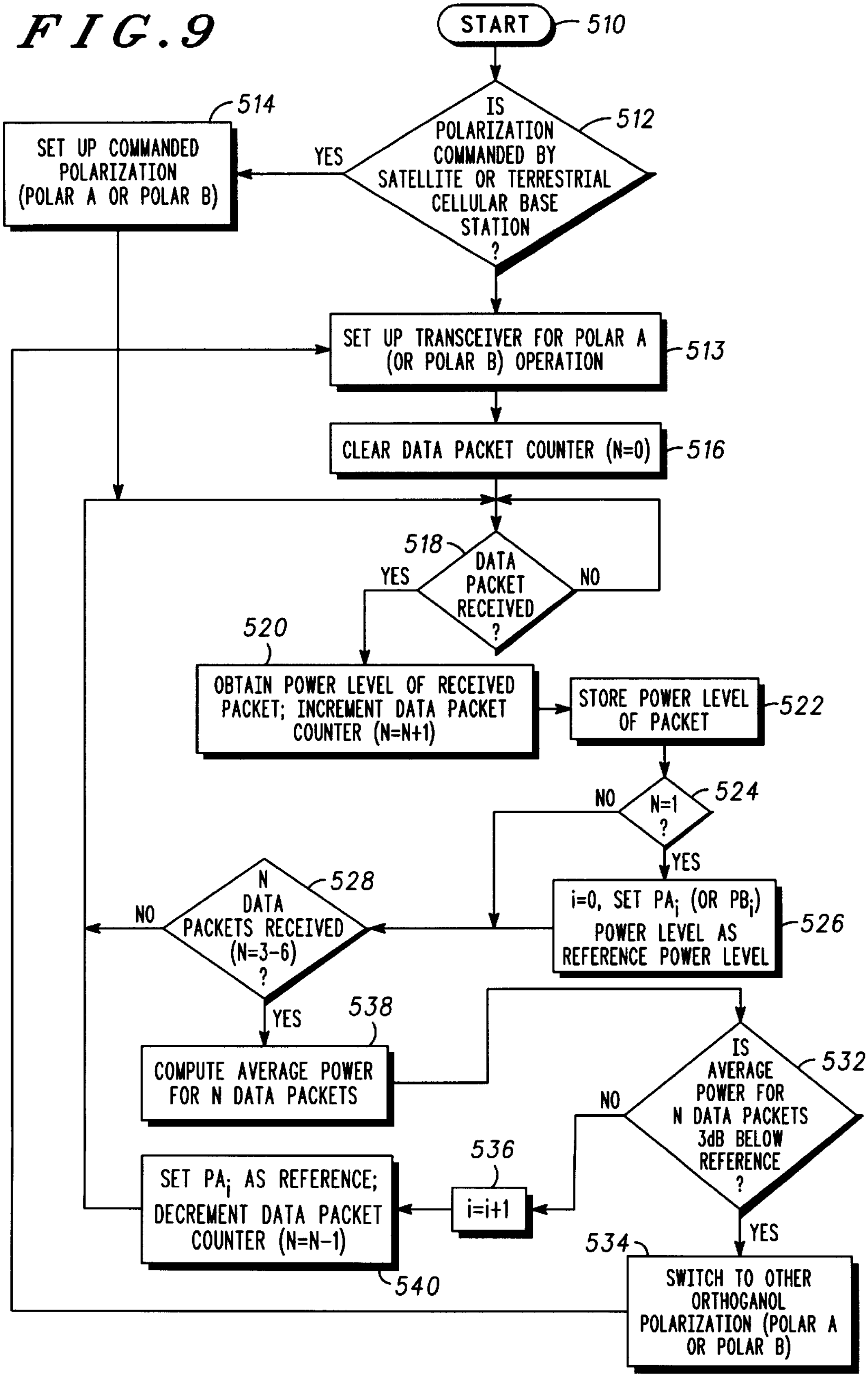
FIG. 9 is a flowchart for the preferred embodiment of the polarization switching method of the present invention.

The method of polarization switching is further described with reference to the polarization switching logic flowchart of FIG. 9. The method begins at block 510. In decision block 512, processor 444 determines whether a particular polarization has been commanded by either the satellite 124 or the terrestrial cellular base station 122. If either the satellite 124 or the base station 122 has commanded a particular polarization, the processor 444 in block 514 initializes the transceiver of the SU 116, 118, 120 to use the commanded polarization (RHCP or LHCP) and then proceeds to decision block 518. If neither the satellite 124 nor the base station 122 has commanded a particular polarization, in block 513, the processor 444 sets up the transceiver for polarization A (or polarization B). Initially, the selection of either polarization A or B by the processor 444 is arbitrary.

Next, in block 516, the processor 444 clears its data packet counter. Then, in decision block 518, the processor determines whether a data packet has been received. If a data packet has not been received, the processor 444 continues checking until a data packet is received. When a data packet is received, the processor 444 in block 520 obtains the power level of the received packet and increments its data packet counter. The power level measurement can be performed by the RSSP circuits (not shown), for example. Next, in block 522, the processor stores the power level of the data packet. Then, in decision block 524, the processor checks whether the previously received data packet was the first data packet. If it was the first data packet, the processor in block 526, initializes variable "i" to zero, sets $PA_i$ (or $PB_i$) power level as the reference power level, and proceeds to decision block 528. If the previously received data packet was not the first data packet, the processor 444 determines, in decision block 528, whether three to six data packets have been received. If three to six packets have not been received, the processor proceeds back to decision block 518 and waits for another packet to be received. If three to six packets have been received, the processor 444, in block 538, computes the average power for the number of data packets received.

Next, in decision block 532, the processor 444 determines whether the average power for the number of packets received is 3 dB below the previously established reference ($PA_0$). If the average power is 3 dB below the reference, the processor, in block 534, commands the first RF switch 448 to switch to polarization B (or polarization A), proceeds back to block 513 to set up the transceiver for the new, opposite-sense polarization, and repeats the process. If the average power is not 3 dB below the reference, the processor, in block 536, increments variable "i". Then, in block 540, the processor sets a new reference power level ($PA_i$), decrements the data packet counter and proceeds back to block 518 to repeat the process.

The polarization switching logic of the present invention, although described using two circular polarizations, can be applied to switching between any two linear polarizations or any two orthogonal polarizations, thus extending the utility and breadth of the present invention to various systems.

Figure 11:
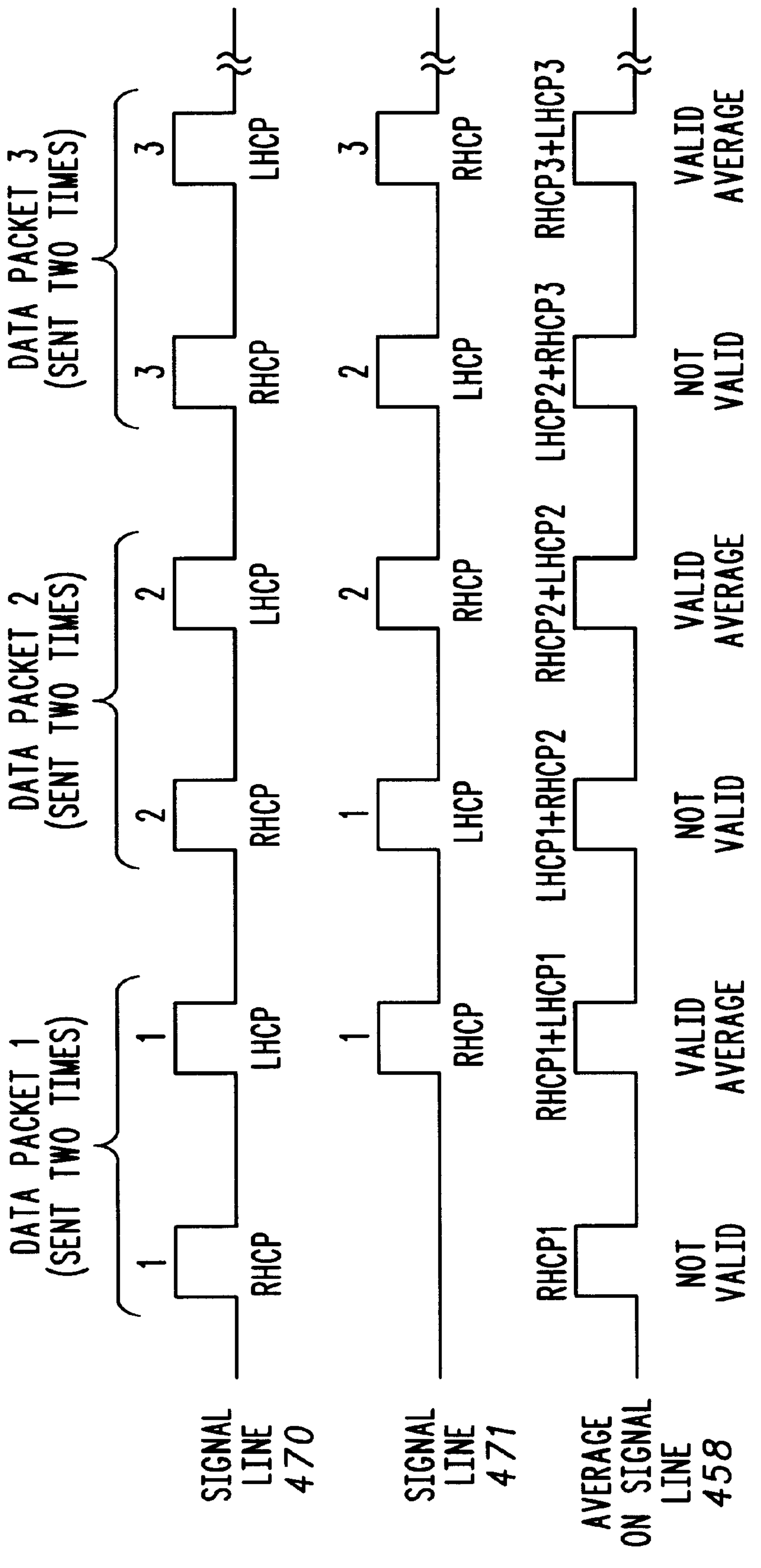
FIG. 11 is a timing diagram for the preferred embodiment of the polarization averaging method of the present invention.

In a second method of overcoming fading of a call between mobile subscribers 110, 112, 114 (FIG. 1) due to multipath, polarization averaging is implemented. Polarization averaging is used when fading occurs quickly and cannot be predicted, such as when a mobile subscriber is engaged in a call while driving a car. In the polarization averaging method, the SU 116, 118, 120 receives the same data packet from the transmitter (either satellite 124 or cellular base station 122), once at each sense of circular polarization (RHCP and LHCP). The LHCP data packet contains the same data as the RHCP data packet, but is delayed in time to allow the polarization of the SU 116, 118, 120 to be changed. With reference to FIG. 4, when the processor selects polarization averaging, first RF switch 448 is set to one of the orthogonal polarizations, RHCP in the present example, and second and third RF switches 460, 462 are closed. Switches 460 and 462 remain closed as long as polarization averaging is selected. The RHCP data packet is received from the RF Hybrid RHCP 412 and sent through RF coupler 449 to amplifier 450 and second RF coupler 451 to the receiver (not shown) via signal line 458. This RHCP packet is ignored by the receiver since it is not an average of two packets from different polarizations. A portion of the RHCP data packet is coupled off by RF coupler 449 and sent through the delay line block 461 (via first RF coupler 449 and second RF switch 460) with a delay equal to the data rate of the packet. The delayed signal is sent to the second RF coupler 451 via third RF switch 462. Prior to the LHCP data packet (containing the same data as the RHCP packet) being received, the processor switches first RF switch 448 to LHCP polarization. The LHCP data packet is received from the RF Hybrid LHCP 410, sent through first RF coupler 449, amplified by amplifier 450 and added to (averaged) the delayed RHCP data packet by the second RF coupler 451. Thus, a signal representing an average of the two polarizations is sent to the receiver back end via signal line 458. In a similar manner, subsequent packets are subjected to the same polarization switching, time delay and addition with the appropriate orthogonally polarized packet as shown in FIG. 11.

Figure 8:
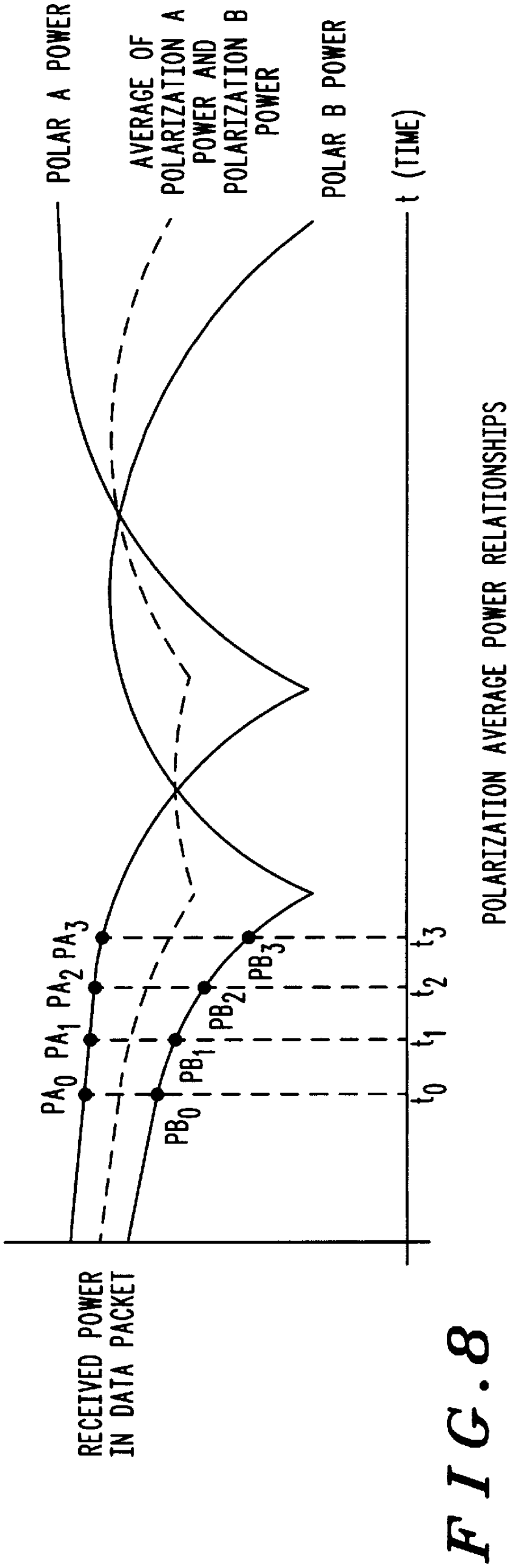
FIG. 8 is a graphical plot of a typical power relationship between sampled data packets for the polarization averaging method.
Figure 10:
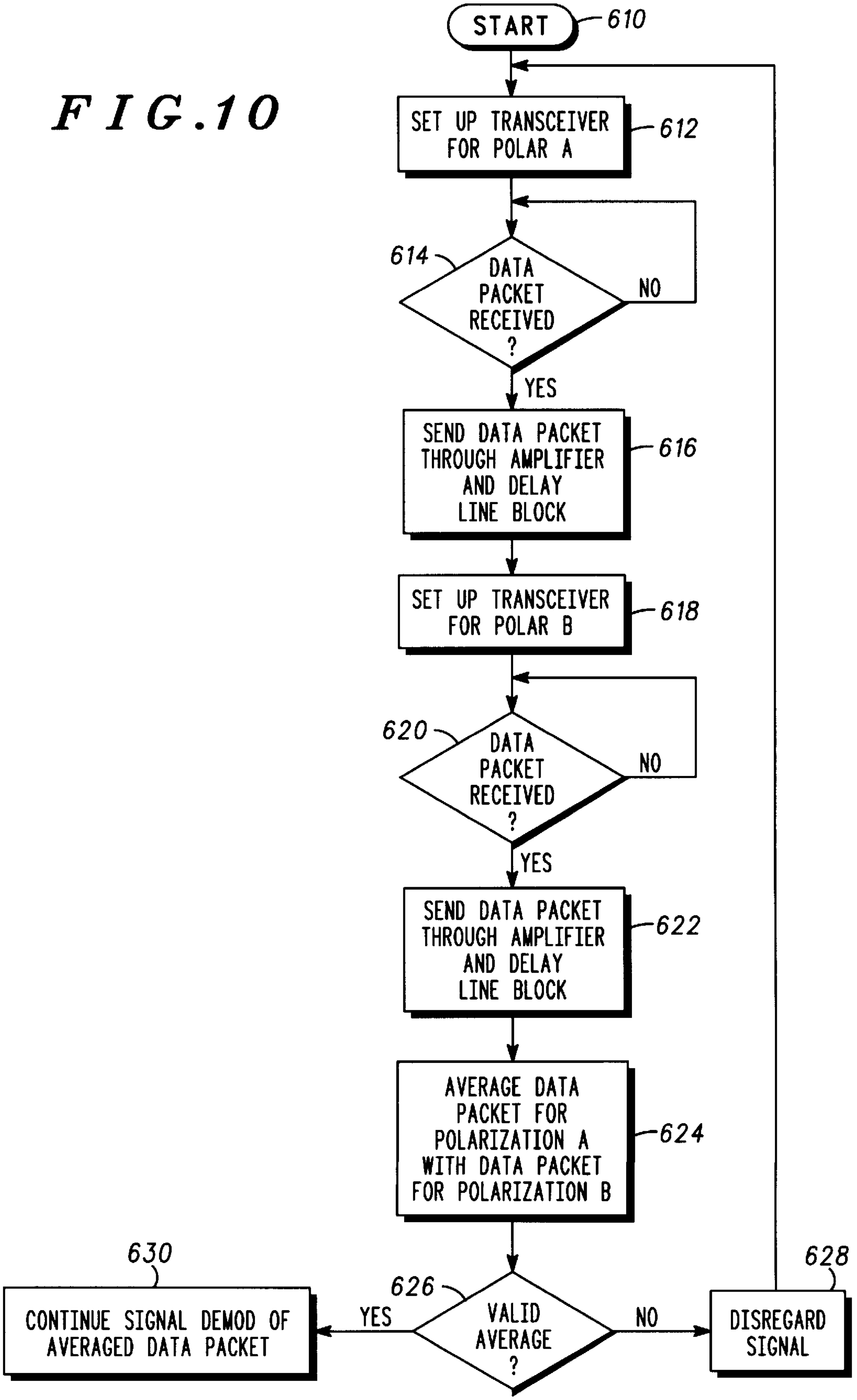
FIG. 10 is a flowchart for the preferred embodiment of the polarization averaging method of the present invention.

The method of polarization averaging is further described with reference to the polarization averaging logic flowchart of FIG. 10, the polarization averaging power relationships graph of FIG. 8 and the timing diagram of FIG. 11. In FIG. 10, the method begins at block 610. In block 612, the processor 444 sets up the SU transceiver to receive polarization A. Next, in decision block 614, the processor 444 determines whether a data packet was received. If a data packet was not received, the processor 444 continues checking until a data packet is received. When a data packet is received, in block 616, the packet is sent through amplifier 450 and delay line block 461. Referring to FIG. 11, the data packet (RHCP 1) for the chosen polarization first appears on signal line 470. This same data packet appears on signal line 471 after one data packet period time delay. Next, at block 618, the processor 444 sets up the SU transceiver to receive polarization B. Then, at decision block 620, the processor 444 determines whether a data packet was received for polarization B. If a data packet was not received, the processor 444 continues checking until a data packet is received. When a data packet is received, in block 622, the packet is passed through amplifier 450 and delay line block 461. The non-delayed signal (LHCP 1) appears at signal line 470 and the delayed signal (LHCP 1) appears at signal line 471 after one data packet time delay. RF coupler 451 in FIG. 4 adds the signals (RHCP 1 and LHCP 1) on signal line 470 and signal line 471 in block 624 to produce the signal on signal line 458 (RHCP 1+LHCP 1). The processor 444 in decision block 626 checks for a valid average of the data packets for polarization A and polarization B (time alignment of the data packets for polarization A and polarization B for the same data packet pair). A valid average occurs for alternating packets on signal line 458 as shown in FIG. 11. If a valid average is not obtained, in block 628 the processor 444 disregards the signal and restarts the sequence for the next pair of orthogonally polarized data packets. If a valid average is obtained in block 626, the processor 444 continues demodulation of the average data packet in block 630.

The antenna arrangement of the present invention provides a single antenna structure capable of operation in multiple frequency bands while at the same time decreasing the effect of fading of a call due to multipath. Those skilled in the art will recognize that various modifications and variations can be made in the apparatus of the present invention and in construction of this apparatus without departing from the scope or spirit of this invention. For example, the techniques of polarization averaging and polarization switching could be reversed with SU 116, 118, 120 as the transmitter and either satellite 124 or cellular base station 122 implementing the polarization switching or averaging technique.

What is claimed is:

1. A communications device comprising:

a dual orthogonally polarized antenna having an antenna core with a first plurality of orthogonally polarized antenna elements wound about the antenna core in a first direction and with a second plurality of orthogonally polarized antenna elements wound about the antenna core in a second direction; and polarization averaging and switching circuitry coupled to the antenna, the polarization averaging and switching circuitry comprising:

a first switch coupled to the antenna for switching between a first polarization and a second polarization of the antenna;

a controller for controlling the switch to switch between the first polarization of the antenna and the second polarization of the antenna;

a duplexor coupled to the first switch;

a first coupler coupled to the duplexor;

a delaying mechanism having a first end and a second end, wherein the delaying mechanism is coupled to the first coupler on the first end;

a second RF coupler coupled to the second end of the delaying mechanism;

an amplifier coupled between the first coupler and the second RF coupler;

a second switch coupled between the first coupler and the first end of the delaying mechanism; and a third RF switch coupled between the second end of the delaying mechanism and the second coupler, wherein the controller is coupled to the second RF switch and the third switch.

2. The communications device of claim 1 wherein the controller monitors a power level of the signal and causes the switch to change position when the power level decreases by a predetermined amount.

3. The communications device of claim 2 wherein the predetermined amount is at least 3 dB.

4. The communications device of claim 1 wherein a plurality of RF PIN diodes are disposed in the first plurality of orthogonally polarized antenna elements and the second plurality of orthogonally polarized antenna elements at points of overlap between the first plurality of orthogonally polarized antenna elements and the second plurality of orthogonally polarized antenna elements.

5. The communications device of claim 4 further comprising a plurality of bias circuits for selectively biasing the plurality of PIN diodes on or off to control an operating frequency of the antenna.

6. A communications device having a transmitter and receiver capable of transmitting and receiving a signal on dual orthogonal polarizations and capable of averaging the polarizations, the device comprising:

a dual orthogonally polarized antenna coupled to the receiver, wherein the antenna has an antenna core;

a first switch coupled to the antenna for switching between a first polarization and a second polarization of the antenna;

a first RF coupler coupled to the first switch;

a delaying mechanism having a first end and a second end, wherein the delaying mechanism is coupled to the first RF coupler on the first end;

a second RF coupler coupled to the second end of the delaying mechanism;

a controller coupled to the first switch;

a second RF switch coupled between the first RF coupler and the first end of the delaying mechanism; and a third RF switch coupled between the second end of the delaying mechanism and the second RF coupler, wherein the controller is coupled to the second RF switch and the third RF switch.

* * * * *